US010882644B1

(12) United States Patent
Schwarz et al.

(10) Patent No.: US 10,882,644 B1
(45) Date of Patent: Jan. 5, 2021

(54) SPACECRAFT RENDEZVOUS AND DOCKING TECHNIQUES

(71) Applicant: Space Systems/Loral, LLC, Palo Alto, CA (US)

(72) Inventors: Robert Erik Schwarz, Los Gatos, CA (US); John Douglas Lymer, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 452 days.

(21) Appl. No.: 15/729,502

(22) Filed: Oct. 10, 2017

Related U.S. Application Data

(60) Provisional application No. 62/539,456, filed on Jul. 31, 2017.

(51) Int. Cl.
*B64G 1/64* (2006.01)
*B64G 1/24* (2006.01)
(Continued)

(52) U.S. Cl.
CPC ............ *B64G 1/646* (2013.01); *B64G 1/24* (2013.01); *B64G 1/36* (2013.01); *B64G 1/26* (2013.01);
(Continued)

(58) Field of Classification Search
CPC ............ B64G 1/646; B64G 1/36; B64G 1/24
See application file for complete search history.

(56) References Cited

U.S. PATENT DOCUMENTS

| 3,262,654 A | * | 7/1966 | Kaempen | B64G 1/646 |
| | | | | 244/172.4 |
| 4,898,349 A | * | 2/1990 | Miller | B64G 1/646 |
| | | | | 244/172.4 |

(Continued)

FOREIGN PATENT DOCUMENTS

| CN | 101016971 A | * | 8/2007 |
| CN | 102620656 A | | 8/2012 |
| CN | 104406594 A | | 3/2015 |

OTHER PUBLICATIONS

Jasiobedzki et al., "Autonomous Satellite Rendezvous and Docking Using LIDAR and Model Based Vision," MDA Space Missions, 9445 Airport Road, Brampton, ON, Canada L6S 4J3, Dept. of Electrical & Computer Engineering, School of Computing, Queen's University, Canada, Spaceborne Sensors II, edited by Peter Tchoryk, Brian Holz, Proc. of SPIE vol. 5798 (SPIE, Bellingham, WA, 2005) 0277-786X/05/$15 doi: 10.1117/12.604011, 12 pages.

(Continued)

*Primary Examiner* — Behrang Badii
*Assistant Examiner* — Daniel L Greene
(74) *Attorney, Agent, or Firm* — Weaver Austin Villeneuve & Sampson LLP

(57) ABSTRACT

Techniques for performing spacecraft rendezvous and/or docking include operating a first orbiting spacecraft, the first spacecraft including a sensor arrangement, a first processor and a first inter-satellite link (ISL) arrangement and performing one or both of a rendezvous operation and a docking operation with the first spacecraft and a second orbiting spacecraft, the second spacecraft including one or more actuators. The performing one or both of the rendezvous operation and the docking operation includes determining a pose and pose rate of the second spacecraft relative to the first spacecraft using observations made by the sensor (Continued)

arrangement and determining a desired approach trajectory for the second spacecraft.

16 Claims, 2 Drawing Sheets

(51) Int. Cl.
*B64G 1/36* (2006.01)
*B64G 1/28* (2006.01)
*B64G 1/26* (2006.01)

(52) U.S. Cl.
CPC ........ *B64G 1/283* (2013.01); *B64G 2001/245* (2013.01)

(56) References Cited

U.S. PATENT DOCUMENTS

| | | | |
|---|---|---|---|
| 5,193,766 A * | 3/1993 | Kawano | B64G 1/24 244/164 |
| 5,550,742 A * | 8/1996 | Furuya | B64G 1/244 701/408 |
| 5,734,736 A | 3/1998 | Palmer et al. | |
| 6,091,345 A * | 7/2000 | Howard | B64G 1/24 244/172.4 |
| 6,275,751 B1 * | 8/2001 | Stallard | B64G 1/646 244/164 |
| 6,364,252 B1 * | 4/2002 | Anderman | B64G 1/007 244/158.6 |
| 8,144,931 B1 * | 3/2012 | Hartman | G06K 9/741 348/169 |
| 2005/0067534 A1 | 3/2005 | Anderman et al. | |
| 2007/0179685 A1 * | 8/2007 | Milam | G01C 21/00 701/3 |
| 2009/0194639 A1 * | 8/2009 | El Mabsout | B64G 1/242 244/171.5 |
| 2012/0023948 A1 * | 2/2012 | Janson | F03G 7/10 60/721 |
| 2018/0186476 A1 * | 7/2018 | Poncet | B64G 1/007 |
| 2018/0341021 A1 * | 11/2018 | Schmitt | G01S 17/89 |

OTHER PUBLICATIONS

U.S. Appl. No. 15/689,993, filed Aug. 29, 2017, Schwarz et al.

* cited by examiner

SPACECRAFT RENDEZVOUS AND DOCKING TECHNIQUES

CROSS-REFERENCE TO RELATED APPLICATIONS

This disclosure claims priority to U.S. Provisional Patent Application No. 62/539,456 filed Jul. 31, 2017, entitled "SPACECRAFT RENDEZVOUS AND DOCKING TECHNIQUES", assigned to the assignee hereof, the disclosure of which is hereby incorporated by reference in its entirety into this Patent Application for all purposes.

TECHNICAL FIELD

This invention relates generally to spacecraft, and more particularly to techniques for autonomous or semi-autonomous rendezvous and/or docking of two or more spacecraft.

BACKGROUND

The assignee of the present invention designs and manufactures spacecraft for, inter alia, communications and broadcast services. In order to prolong a spacecraft's life and/or to provide for increased payload flexibility, various types of on-orbit servicing may be contemplated. For example, an orbiting (destination) spacecraft may be refueled or repaired by a service (visiting) spacecraft. As a further example, a destination spacecraft may be refitted with an additional or replacement payload that is delivered to the vicinity of the destination spacecraft by a launch vehicle upper stage or an orbit transfer vehicle. In some implementations, the destination spacecraft may be a persistent platform as described in U.S. patent application Ser. No. 15/689,993, filed Aug. 29, 2016, entitled "SELF-ASSEMBLING PERSISTENT SPACE PLATFORM", assigned to the assignee of the present invention, the disclosure of which is hereby incorporated by reference into the present disclosure in its entirety.

Improved techniques for autonomous or semi-autonomous rendezvous and docking of a visiting spacecraft with a destination spacecraft are desirable.

SUMMARY

According to some implementations, a method includes operating a first orbiting spacecraft, the first spacecraft including a sensor arrangement, a first processor and a first inter-satellite link (ISL) arrangement and performing one or both of a rendezvous operation and a docking operation with the first spacecraft and a second orbiting spacecraft, the second spacecraft including one or more actuators. The performing one or both of the rendezvous operation and the docking operation includes determining a pose and pose rate of the second spacecraft relative to the first spacecraft using observations made by the sensor arrangement and determining a desired approach trajectory for the second spacecraft.

In some examples, determining the desired approach trajectory for the second spacecraft may be performed by the first processor.

In some examples, performing one or both of the rendezvous operation and the docking operation may include transmitting to the second spacecraft, by way of the first ISL arrangement, a signal indicating a twelve degree of freedom (12 DOF) error in pose and pose rate with respect to the desired approach trajectory.

In some examples, performing one or both of the rendezvous operation and the docking operation may include determining one or both of a sequence of maneuvers and a set of actuator commands to be executed by the second spacecraft in order to follow the desired approach trajectory and transmitting to the second spacecraft, by way of the first ISL arrangement, instructions for executing one or both of the sequence of maneuvers and the set of actuator commands.

In some examples, performing one or both of the rendezvous operation and the docking operation may include: operating the second orbiting spacecraft, the second spacecraft including a second processor and a second ISL arrangement; receiving, at the second spacecraft, by way of the second ISL arrangement, the instructions; processing the instructions with the second processor; and executing, with the second processor one or both of the sequence of maneuvers and the set of actuator commands in accordance with the processed instructions.

In some examples, the sensor arrangement may include one or more of an optical imaging subsystem, a lidar subsystem and a radar subsystem.

In some examples, the actuators may include one or more of thrusters, reaction wheels, magnetic torquers, and solar sails.

According to some implementations, a first spacecraft includes a sensor arrangement, a first processor and a first inter-satellite link (ISL) arrangement. The sensor arrangement is configured to make observations of a second spacecraft. The first processor is configured to determine a pose and pose rate of the second spacecraft relative to the first spacecraft using the observations, and determine a desired approach trajectory for the second spacecraft in order to execute one or both of a rendezvous operation and a docking operation.

In some examples, the first spacecraft may be configured to control one or both of the rendezvous operation and the docking operation by transmitting to the second spacecraft, by way of the first ISL arrangement, a signal indicating a twelve degree of freedom error in pose and pose rate with respect to the desired approach trajectory.

In some examples, the first spacecraft may be configured to control one or both of the rendezvous operation and the docking operation by: determining one or both of a sequence of maneuvers and a set of actuator commands to be executed by the second spacecraft in order to follow the desired approach trajectory; and transmitting to the second spacecraft, by way of the first ISL arrangement, instructions for executing one or both of the sequence of maneuvers and the set of actuator commands.

In some examples, one or both of the rendezvous operation and the docking operation may include: operating the second spacecraft, the second spacecraft including a second processor and a second ISL arrangement; receiving, at the second spacecraft, by way of the second ISL arrangement, the instructions; processing the instructions with the second processor; and executing, with the second processor one or both of the sequence of maneuvers and the set of actuator commands in accordance with the processed instructions.

In some examples, the sensor arrangement may include one or more of an optical imaging subsystem, a lidar subsystem and a radar subsystem.

According to some implementations, a system includes a first orbiting spacecraft including a sensor arrangement, a first processor and a first inter-satellite link (ISL) arrangement and a second orbiting spacecraft including a second processor and one or more actuators. The sensor arrangement is configured make observations of the second spacecraft. The system is configured to perform one or both of a rendezvous operation and a docking operation of the first spacecraft and the second spacecraft. One or both of the rendezvous operation and the docking operation includes determining a pose and pose rate of the second spacecraft relative to the first spacecraft using observations made by the sensor arrangement and determining a desired approach trajectory for the second spacecraft.

In some examples, determining the desired approach trajectory for the second spacecraft may be performed by the first processor.

In some examples, the first spacecraft may be configured to control one or both of the rendezvous operation and the docking operation by transmitting to the second spacecraft, by way of the first ISL arrangement, a signal indicating a twelve degree of freedom error in pose and pose rate with respect to the desired approach trajectory.

In some examples, the first spacecraft may be configured to control one or both of the rendezvous operation and the docking operation by: determining one or both of a sequence of maneuvers and a set of actuator commands to be executed by the second spacecraft in order to follow the desired approach trajectory; and transmitting to the second spacecraft, by way of the first ISL arrangement, instructions for executing one or both of the sequence of maneuvers and the set of actuator commands.

In some examples, one or both of the rendezvous operation and the docking operation may include: operating the second orbiting spacecraft, the second spacecraft including a second processor and a second ISL arrangement; receiving, at the second spacecraft, by way of the second ISL arrangement, the instructions; processing the instructions with the second processor; and executing, with the second processor one or both of the sequence of maneuvers and the set of actuator commands in accordance with the processed instructions.

In some examples, the sensor arrangement may include one or more of an optical imaging subsystem, a lidar subsystem and a radar subsystem.

In some examples, the actuators may include one or more of thrusters, reaction wheels, magnetic torquers, and solar sails.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Figure 1:
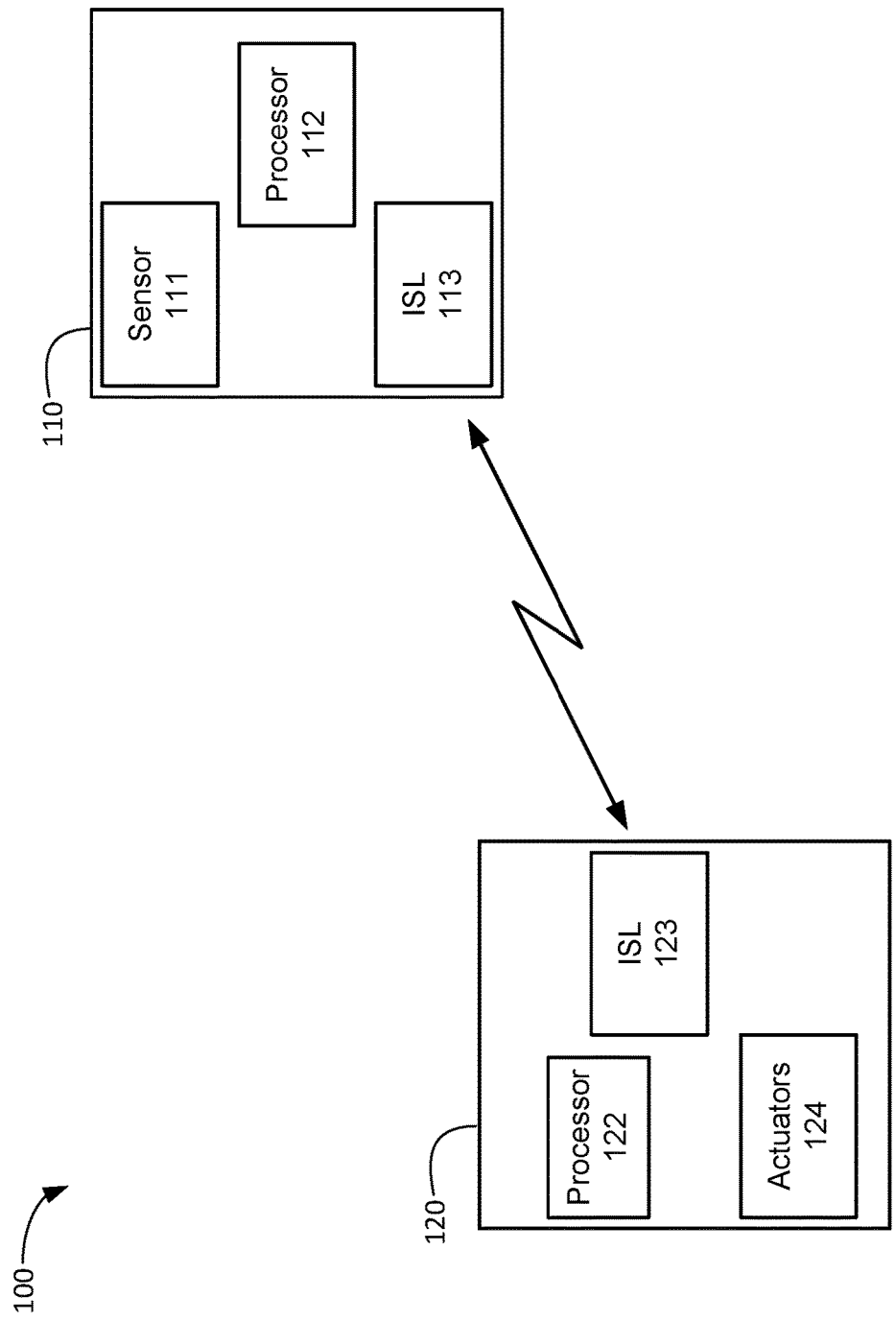
FIG. 1 illustrates a system for spacecraft rendezvous and/or docking according to an implementation.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The term "docking" includes a conjunction of two space vehicles wherein the two vehicles experience a controlled collision to engage a capture feature, the energy of collision being the motive force. The term "docking" as used herein also encompasses a conjunction of two space vehicles wherein a first spacecraft is maneuvered proximal to a second spacecraft, after which a manipulator (e.g., a robotic arm) disposed on one of the spacecraft engages with, for example, a grappling fixture on the other spacecraft, such that the two spacecraft are mechanically coupled.

The term "pose" as used herein includes the three translational components of position and the three rotational components of orientation. The term "pose rate" includes any associated derivatives of pose such as the three components of translational motion and the three components of rotational motion.

On-orbit servicing of a first (destination) spacecraft by a second (visiting) spacecraft generally require rendezvous and/or docking operations. Preferably, these operations may be carried out autonomously or semi-autonomously, using only sensors, processors, and actuators on board the spacecraft. In the absence of the presently disclosed techniques, at least one of the spacecraft carries a suite of sensors, processors, and actuators sufficient to determine and adjust pose and pose rates of one spacecraft with respect to another spacecraft.

The present inventors have appreciated that distributing the suite of sensors, processors, and actuators between the visiting spacecraft and the destination spacecraft can reduce the cost and complexity of supporting rendezvous operations. For example, where the destination spacecraft is a long-lived persistent platform that may undergo a series of servicing operations during its life, it may be advantageous to dispose most or all of the sensing and processing capabilities necessary for a rendezvous and docking operation on the destination spacecraft. The visiting spacecraft may, accordingly, be configured so as to avoid including most or all such equipment, thus reducing the mass, cost and complexity of the visiting spacecraft.

FIG. 1 illustrates a system for spacecraft rendezvous and/or docking according to an implementation. The system 100 includes a destination spacecraft 110 and a visiting spacecraft 120. The destination spacecraft 110 may be disposed in an orbit about a celestial body such as, for example, the earth. In some implementations, the destination spacecraft 110 may be disposed in a geosynchronous orbit. In some implementations, the destination spacecraft 110 may be disposed in a low or medium earth orbit. The destination spacecraft 110 may include a payload (not illustrated) and associated power and telemetry and command equipment (not illustrated). The destination spacecraft 110 may include a suite of equipment configured for use during spacecraft rendezvous and docking operations. For example, in the illustrated implementation, the destination spacecraft 110 includes a sensor arrangement 111, a first processor 112, and a first inter-satellite link (ISL) arrangement 113. The visiting spacecraft 120 may likewise include a suite of equipment configured for use during spacecraft rendezvous and docking operations. For example, in the illustrated implementation, the visiting spacecraft 120 includes a second processor 122, a second ISL arrangement 123 and actuators 124. The actuators 124 may include thrusters, reaction wheels, magnetic torquers, and/or solar sails, for example.

The sensor arrangement 111 may include one or more of cameras, and/or one or more subsystems for detection and ranging operable at optical or radio frequency ranges, such as a lidar subsystem and/or a radar subsystem, for example. The sensor arrangement 111 may be configured to make observations of the visiting spacecraft 120. The sensor arrangement 111 may be operable over a range of distances between the destination spacecraft 110 and the visiting spacecraft 120. In some implementations, the sensor arrangement 111 and the first ISL arrangement 113 may each be configured to accommodate a range of separation distances between the destination spacecraft 110 and the visiting spacecraft 120. For example, the sensor 111 and the first ISL arrangement 113 may be operable over a separation distance in the range of 0-1000 KM or more, in some implementations.

Using observations made by the sensor 111, a pose and pose rate of the visiting spacecraft 120 relative to the destination spacecraft 110 may be determined. In some implementations, the first processor 112 may analyze observations made by the sensor arrangement 111 in order to determine the pose and pose rates of the visiting spacecraft 120 relative to the destination spacecraft 110.

From the determined pose and pose rates of the visiting spacecraft 120, a desired approach trajectory for the visiting spacecraft 120 may be determined. In some implementations, the first processor 112 may be configured to determine a desired approach trajectory for the visiting spacecraft 120. In addition, in some implementations, the first processor 112 may be configured to determine a sequence of maneuvers and/or actuator commands, to be executed by the visiting spacecraft 120, in order to follow the desired approach trajectory. In some implementations, the first processor 112 may be configured to send instructions to the visiting spacecraft 120 that take into account particular characteristics of the visiting spacecraft 120 in addition to the pose and pose rate of the spacecraft 120. Information defining these particular characteristics may include, for example, mass and moments of inertia of the spacecraft 120 and performance characteristics of the actuators 124. In some implementations, the information may be included in a configuration file uploaded to the processor 112 from the ground. Alternatively, or in addition, some or all of the information may be relayed from the visiting spacecraft 120 to the destination spacecraft by way of the first ISL arrangement 113 and the second ISL arrangement 123.

Instructions for executing the sequence of maneuvers and/or actuator commands may be transmitted from the destination spacecraft 110 to the visiting spacecraft 120 by way of the ISL arrangement 113 of the destination spacecraft 110 and the ISL arrangement 123 of the visiting spacecraft 120. The second processor 122 may be configured to receive the instructions for executing the sequence of maneuvers and/or actuator commands from the ISL arrangement 123. Based on the received instructions, the second processor 122 may control actuators 124 to cause the visiting spacecraft 120 to follow the desired approach trajectory. Actuators 124 may include one or more thrusters, reaction wheels, magnetic torquers, or solar sails, for example. As a result of following the desired approach trajectory, the visiting spacecraft 120 may approach, rendezvous with, and/or dock with the destination spacecraft 110.

In some implementations, the second spacecraft 120 may receive instructions from the first spacecraft 110 by way of the first ISL arrangement 113 and the second ISL arrangement 123. The second processor 122 may process the received instructions and execute one or both of the sequence of maneuvers and the set of actuator commands in accordance with the processed instructions.

As a result of the above-described implementation, there is no need for the visiting spacecraft 120 to include sensors for observing the destination spacecraft 110. Moreover, the second processor 122 may be appreciably simplified, because the second processor 122 may omit a capability to determine the desired approach trajectory when the determination of the desired approach trajectory is performed by the first processor 112.

More generally, the presently disclosed techniques contemplate distributing functions of pose and pose rate determination, control processing, and actuation among two vehicles performing a space rendezvous. The mix of which functions reside where may be selected in view of the forecasted needs of a planned mission. For example, in an implementation, pose and pose rate determination, and trajectory error processing is performed by the destination spacecraft. The destination spacecraft may then broadcast a signal indicating a twelve degree of freedom error in pose and pose rate with respect to the desired approach trajectory. Having received the 6DOF error signal, a processor on the visiting spacecraft may use included attitude control algorithms to reduce the error. Thus, functions of sensing and actuation are cooperatively distributed between the visiting spacecraft and the destination spacecraft.

In some implementations, the cost and complexity of rendezvous systems are consolidated onto a relatively small number of destination spacecraft. A relatively large number of visiting spacecraft may be "guided" by the destination spacecraft into a rendezvous trajectory, with the visiting spacecraft using their existing internal control algorithms. In some implementations, the destination vehicle may require little or no prior knowledge of the inertial or dynamic properties of the visiting vehicle. For example, an arrangement of targets may be used to generate a generic pose which is independent of the specific geometry of the visiting spacecraft.

Figure 2:
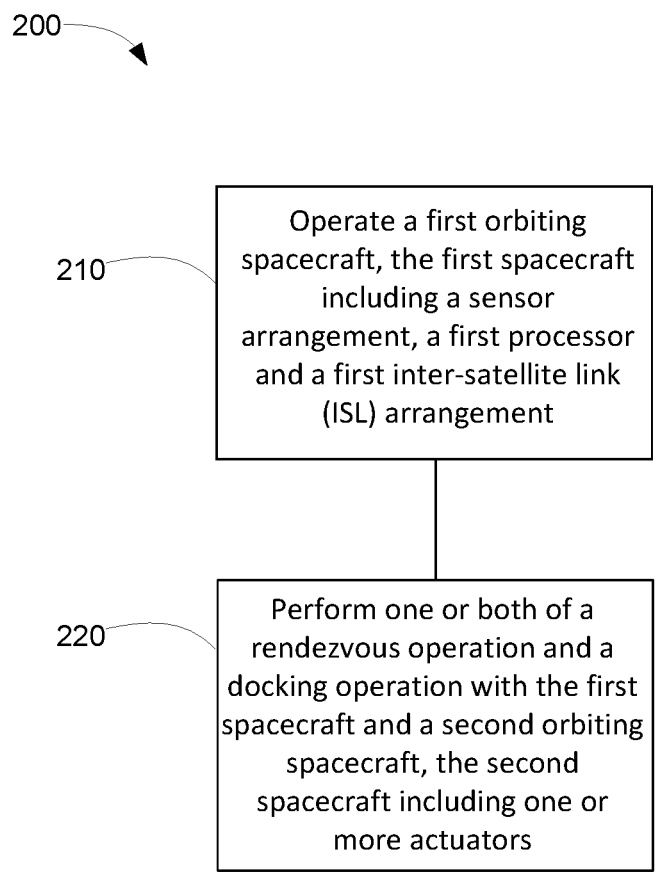
FIG. 2 illustrates a process flow diagram for a rendezvous and/or docking technique in accordance with an implementation

FIG. 2 illustrates a process flow diagram for a rendezvous and/or docking technique in accordance with an implementation. As described hereinabove a first spacecraft and a second spacecraft may rendezvous and/or dock where, advantageously, functions of sensing and actuation are cooperatively distributed between the first spacecraft and the second spacecraft. The method 200 may start, at block 210 with operating a first orbiting spacecraft, the first spacecraft including a sensor arrangement, a first processor and a first inter-satellite link (ISL) arrangement. The method 200 may finish, at block 220, with performing one or both of a rendezvous operation and a docking operation with a second orbiting spacecraft, the second spacecraft including one or more actuators. The performing one or both of the rendezvous operation and the docking operation may include determining a pose and pose rate of the second spacecraft relative to the first spacecraft using observations made by the sensor arrangement and determining a desired approach trajectory for the second spacecraft. The desired approach trajectory may be achieved by controlling the one or more actuators on the second spacecraft.

In some implementations, determining the desired approach trajectory for the second spacecraft is performed by the first processor on the first spacecraft.

In some implementations, performing one or both of the rendezvous operation and the docking operation includes transmitting to the second spacecraft, by way of the first ISL arrangement, a signal indicating a twelve degree of freedom error in pose and pose rate with respect to the desired approach trajectory. The second processor may be configured to determine and send commands to the one or more actuators on the second spacecraft so as to reduce the twelve degree of freedom error.

In some implementations, the first spacecraft may be configured to control one or both of the rendezvous operation and the docking operation by determining one or both of a sequence of maneuvers and a set of actuator commands to be executed by the second spacecraft in order to follow the desired approach trajectory. The first spacecraft may transmit to the second spacecraft, by way of the first ISL arrangement, instructions for executing one or both of the sequence of maneuvers and the set of actuator commands.

Thus, improved rendezvous and docking techniques have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method comprising:
   operating a first orbiting spacecraft, the first spacecraft including a sensor arrangement, a first processor and a first inter-satellite link (ISL) arrangement; and
   performing one or both of a rendezvous operation and a docking operation with the first spacecraft and a second orbiting spacecraft, the second spacecraft including one or more actuators; wherein:
      the one or more actuators include one or more thrusters, reaction wheels, magnetic torquers, or solar sails; and the performing one or both of the rendezvous operation and the docking operation includes:
      using observations made by the sensor arrangement to determine (a) a pose and pose rate of the second spacecraft relative to the first spacecraft, and (b) a desired approach trajectory for the second spacecraft; and
      transmitting to the second spacecraft, by way of the first ISL arrangement, instructions to follow the desired approach trajectory, the instructions including a sequence of maneuvers and/or commands to the one or more actuators.

2. The method of claim 1, wherein determining the desired approach trajectory for the second spacecraft is performed by the first processor.

3. The method of claim 1, wherein performing one or both of the rendezvous operation and the docking operation includes transmitting to the second spacecraft, by way of the first ISL arrangement, a signal indicating a twelve degree of freedom (12 DOF) error in pose and pose rate with respect to the desired approach trajectory.

4. The method of claim 1, wherein performing one or both of the rendezvous operation and the docking operation includes:
   operating the second orbiting spacecraft, the second spacecraft including a second processor and a second ISL arrangement;
   receiving, at the second spacecraft, by way of the second ISL arrangement, the instructions;
   processing the instructions with the second processor; and
   executing, with the second processor one or both of the sequence of maneuvers and the set of actuator commands in accordance with the processed instructions.

5. The method of claim 1, wherein the sensor arrangement includes one or more of an optical imaging subsystem, a lidar subsystem and a radar subsystem.

6. The method of claim 1, wherein the actuators include one or more of thrusters, reaction wheels, magnetic torquers, and solar sails.

7. A first spacecraft comprising a sensor arrangement, a first processor and a first inter-satellite link (ISL) arrangement, wherein
   the sensor arrangement is configured to make observations of a second spacecraft;
   the first processor is configured to determine (a) a pose and pose rate of the second spacecraft relative to the first spacecraft using the observations, and (b) a desired approach trajectory for the second spacecraft in order to execute one or both of a rendezvous operation and a docking operation; and
the first spacecraft is configured to control one or both of the rendezvous operation and the docking operation by:
   transmitting to the second spacecraft, by way of the first ISL arrangement, instructions to follow the desired approach trajectory, the instructions including a sequence of maneuvers to be executed by the second spacecraft and/or commands to one or more of thrusters, reaction wheels, magnetic torquers, or solar sails on board the second spacecraft.

8. The first spacecraft of claim 7, wherein the first spacecraft is configured to control one or both of the rendezvous operation and the docking operation by transmitting to the second spacecraft, by way of the first ISL arrangement, a signal indicating a twelve degree of freedom error in pose and pose rate with respect to the desired approach trajectory.

9. The first spacecraft of claim 7, wherein one or both of the rendezvous operation and the docking operation include:
   operating the second spacecraft, the second spacecraft including a second processor and a second ISL arrangement;
   receiving, at the second spacecraft, by way of the second ISL arrangement, the instructions;
   processing the instructions with the second processor; and
   executing, with the second processor one or both of the sequence of maneuvers and the set of actuator commands in accordance with the processed instructions.

10. The first spacecraft of claim 7, wherein the sensor arrangement includes one or more of an optical imaging subsystem, a lidar subsystem and a radar subsystem.

11. A system comprising:
   a first orbiting spacecraft including a sensor arrangement, a first processor and a first inter-satellite link (ISL) arrangement; and a second orbiting spacecraft including a second processor and one or more actuators; wherein:

the one or more actuators include one or more thrusters, reaction wheels, magnetic torquers, or solar sails the sensor arrangement is configured make observations of the second spacecraft;

the system is configured to perform one or both of a rendezvous operation and a docking operation of the first spacecraft and the second spacecraft by one or both of the rendezvous operation and the docking operation includes:

using observations made by the sensor arrangement to determine (a) a pose and pose rate of the second spacecraft relative to the first spacecraft, and (b) a desired approach trajectory for the second spacecraft; and transmitting to the second spacecraft, by way of the first ISL arrangement, instructions to follow the desired approach trajectory, the instructions including a sequence of maneuvers and/or commands to the one or more actuators.

12. The system of claim 11, wherein determining the desired approach trajectory for the second spacecraft is performed by the first processor.

13. The system of claim 11, wherein the first spacecraft is configured to control one or both of the rendezvous operation and the docking operation by transmitting to the second spacecraft, by way of the first ISL arrangement, a signal indicating a twelve degree of freedom error in pose and pose rate with respect to the desired approach trajectory.

14. The system of claim 11, wherein one or both of the rendezvous operation and the docking operation includes:

operating the second orbiting spacecraft, the second spacecraft including a second processor and a second ISL arrangement;

receiving, at the second spacecraft, by way of the second ISL arrangement, the instructions;

processing the instructions with the second processor; and executing, with the second processor one or both of the sequence of maneuvers and the set of actuator commands in accordance with the processed instructions.

15. The system of claim 11, wherein the sensor arrangement includes one or more of an optical imaging subsystem, a lidar subsystem and a radar subsystem.

16. The system of claim 11, wherein the actuators include one or more of thrusters, reaction wheels, magnetic torquers, and solar sails.

* * * * *